Figure 1:
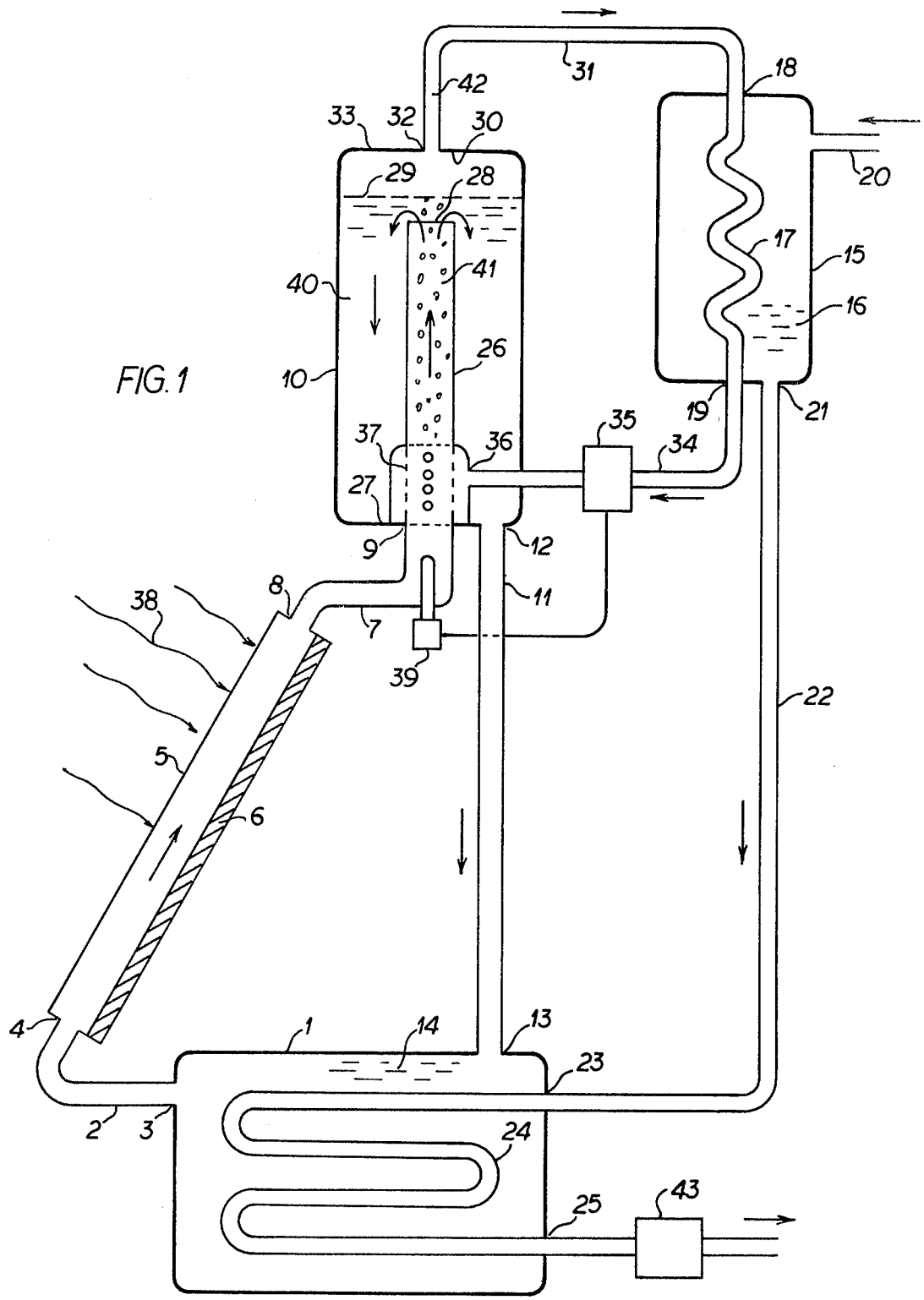

United States Patent [19]

Kraus et al.

[11] 4,246,890

[45] Jan. 27, 1981

[54] PASSIVE SOLAR HEATER FLUID PUMP SYSTEM

[76] Inventors: Robert A. Kraus; Edmund J. Kraus, both of 14160 Redhill Ave., Tustin, Calif. 92680

[21] Appl. No.: 71,786

[22] Filed: Aug. 31, 1979

[51] Int. Cl.³ .................. F24J 3/02; F28D 15/00; C10K 1/08

[52] U.S. Cl. ...................... 126/433; 126/435; 126/437; 165/104 S; 165/105; 261/121 R; 261/151; 261/154; 261/DIG. 32

[58] Field of Search ............... 126/433, 400, 436, 437, 126/435, 422, 419, 421; 165/104 S, 105; 261/151, 131, 154, 121 R

[56] References Cited

U.S. PATENT DOCUMENTS

| 3,894,528 | 7/1975 | Stubblefield | 261/151 |
|---|---|---|---|
| 4,061,131 | 12/1977 | Bohanon | 126/433 |
| 4,067,314 | 1/1978 | Bollefer | 126/433 |
| 4,068,476 | 1/1978 | Kelsey | 126/433 |
| 4,116,222 | 9/1978 | Seifried | 126/435 |
| 4,133,183 | 1/1979 | Albertson | 126/435 |
| 4,173,994 | 11/1979 | Hiser | 165/104 S |
| 4,184,477 | 1/1980 | Yuan | 126/433 |
| 4,189,848 | 2/1980 | Ko et al. | 126/433 |

Primary Examiner—James C. Yeung
Assistant Examiner—Daniel O'Connor

[57] ABSTRACT

A device making use of the gravity generated imbalance within a portion of the system confined upward and downward flowing liquid. A condensed gas of lower boiling point is induced to the portion of the upward flowing heated liquid of higher boiling point. The formation of gas bubbles upon evaporation of the condensed gas within the upward flowing heated liquid, causing fluid displacement thereof, thereby causing a imbalance between the upward flowing liquid and gas mixture, and the downward flowing solid liquid after being separated from the gas. Thus, gravity causing the continuous pumping action of the liquid throughout the system.

3 Claims, 1 Drawing Figure

PASSIVE SOLAR HEATER FLUID PUMP SYSTEM

BACKGROUND

Numerous solar heat collecting systems in a variety of configurations are commercially produced, and marketed. Most of which, are of non passive design. That is to say, they rely on a motor-driven pump for the circulation of the system confined heat-transfer fluid. The collection of a given amount of solar heat in B.T.U. is relatively small. In most cases of the non passive design, the power consumed by the motor-driven pump may well exceed the equivalent in collected solar heat. Hence, the employment of a fluid pump utilizing the available temperature differences within the solar heat collecting system instead of electric power, will significantly advance the state of art. The solar heat collecting system described herein employs in combination, a scheme for pumping fluid within a closed circuit, shown in our previous patents having the U.S. Pat. Nos. 4,030,303 filed Oct. 14, 1975, and the 4,041,710 filed Sept. 9, 1976.

FIELD AND OBJECTS

The invention described herein will find its use as a practical pumping means for efficient solar heat collecting systems.

Accordingly, it is therefore an object of the invention to provide an efficient means for pumping fluid, by generating a difference in specific gravity between a system confined upward and downward flowing heat transfer fluid.

This and other objects will become apparent from the specification, drawing and appended claims.

DRAWING

The drawing FIG. 1, represents the schematic illustration of the passive solar radiant heat collecting system, employing non power consuming pumping means.

In the drawing FIG. 1, 1 represents the primary, insulated liquid storage tank being fluid communicatively connected via piping 2 from its fluid outlet 3 to the fluid inlet 4 of the solar heat collecting panel 5 having the thermal insulation 6. The collecting panel is fluid communicatively connected via piping 7 from its fluid outlet 8 to the fluid inlet 9 of the fluid driver assembly 10. The fluid driver assembly is fluid communicatively connected via piping 11 from its outlet 12 to the fluid inlet 13 of the primary liquid storage tank, thereby completing the closed fluid circuit containing a suitable heat transfer fluid 14. 15 represents the insulated secondary liquid storage tank in which the contained liquid 16 is utilized as a heat sink. The secondary liquid storage tank comprises the gas condenser heat exchanger 17 having the gas inlet 18 and the condensed gas outlet 19, and further comprises the cold liquid supply inlet 20, and the liquid outlet 21. The liquid outlet 21 is fluid communicatively connected via piping 22, to the liquid inlet 23 of the primary heat exchanger 24 being disposed within the primary liquid storage tank, and comprises the liquid outlet 25.

The piping 7 is disposed within the fluid driver assembly to form the fluid riser tube 26, extending from the lower end 27 upward to height 28. 29 is the surface of the heat transfer fluid 14 forming a substantial space between it, and the upper inner end 30 of the fluid driver assembly. The tube 31 fluid communicatively connects the gas outlet 32 at the upper end 33 of the fluid driver assembly, to the gas inlet 18 of the heat exchanger 17 within the secondary liquid storage tank. The outlet 19 of the heat exchanger 17 is fluid communicatively connected via tubing 34 and gas control valve 35 to the gas injector orifice 36, being disposed to extend into the lower portion 37 of the fluid riser tube 26 within fluid driver assembly 10.

In operation, incoming solar thermal radiation 38 strikes the collector panel 5 thereby heating the contained liquid. The heating of the liquid causes a slight thermal expansion of the liquid, and thus produces a slight imbalance in specific gravity between the heated and the colder portion of the liquid. This in turn produces a slow circulation of the system contained liquid 14 in direction upward through the riser tube 26. The thermo probe 39 senses the heat within the rising liquid, which at a given temperature opens the gas control valve 35. Operating the gas control valve 35 allows the cooler condensed gas having an lower boiling point, to be admitted via orifice 36, into the heated liquid at higher boiling point, thereby the admitted gas absorbs heat from the heated liquid, evaporates, and expands while flowing upward within the riser tube 26 in form of tiny gas bubbles, to be separated from the liquid by breaking through its surface 29. The expanding of the gas within the heated liquid, causes fluid displacement, being proportional to the volume of the expanding gas. The fluid displacement within the riser tube 26 in turn, causes the weight of the gas-separated solid downward flowing liquid 40 to overbalance the weight of the upward flowing liquid and gas mixture 41 within the riser tube 26 sufficiently to cause the circulation of the entire contained heat transfer fluid throughout the system. The separated gas 42 flows via tube 31 from the upper end of the fluid driver assembly 10 to the heat exchanger 17, where it is condensed to its liquid state, by the transfer of heat to the colder liquid 16. The condensed gas in liquid state, then is reintroduced to the heated liquid by means of gravity, thus beginning a new cycle. Opening the liquid utility valve 43 admitting colder liquid to enter the secondary liquid storage tank, while warmer liquid flows via piping 22 downward to the primary liquid storage tank 1, where it absorbs more heat through the heat exchanger 24 from the hotter heat transfer fluid 14 before being discharged, to be utilized for process or space heating.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property of privilege is claimed are defined as follows:

1. A solar heat collecting and fluid pump means comprising:
   a. a solar heat collector means having means for receiving an liquid fluid, and means for receiving solar heat for heating of said fluid;
   b. a pump assembly including fluid containment means having fluid inlet and fluid outlet at said containment lower end, and gas outlet at said containment upper end, a vertical tubular member located within said containment being fluid communicatively connected to said fluid inlet having at its lower end a plurality of openings, means for receiving said fluid from said collector means, and means for receiving a condensed gas;

c. a secondary fluid storage tank having a fluid inlet and a fluid outlet, and including an internally located condenser heat exchanger having an gas inlet, and means for receiving said gas from said gas outlet of said containment, and means for conveying the condensed gas via control means to said openings within said tubular member;

d. a primary fluid storage tank having a fluid inlet and a fluid outlet, means for receiving fluid from said containment fluid outlet, and means for conveying said fluid from said outlet to said collector means, and including an internally located heat exchanger having a fluid inlet and means for receiving fluid from said secondary fluid storage tank, and fluid outlet and control means connecting to utility.

2. A device as in claim 1, wherein said solar heat collecting means being thermally insulated.

3. A device as in claim 1, wherein said solar heat collecting means incorporates thermostatic control means.

* * * * *